United States Patent Office 3,368,787
Patented Feb. 13, 1968

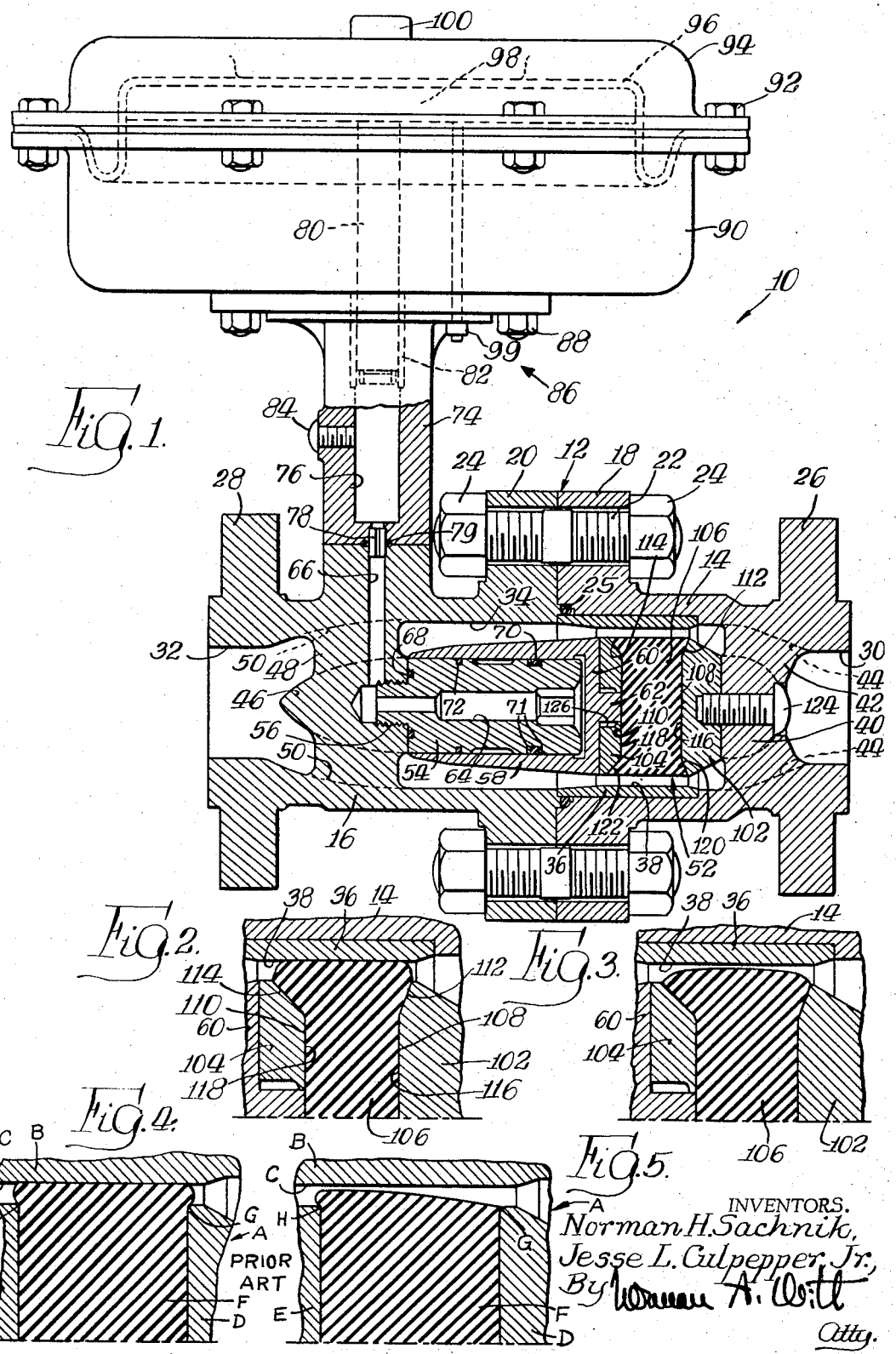

3,368,787
FLOW REGULATOR WITH RADIALLY
EXPANDING ELASTOMERIC BLOCK
Norman H. Sachnik and Jesse L. Culpepper, Jr., Houston,
Tex., assignors to Texsteam Corporation, Houston, Tex.,
a corporation of Texas
Filed Aug. 26, 1964, Ser. No. 392,132
2 Claims. (Cl. 251—63.5)

Our present invention relates to a flow regulator that is adapted to be interposed in a fluid transmsision pipe line to provide for controlled variation in volume of flow therethrough.

A flow regulator of the type to which our present invention pertains comprises a housing having fluid passageway means extending therethrough and having cylindrical valve seat means therein. An inner valve assembly, which includes a pair of outer backing members bonded to the opposite surfaces of an intermediate deformable valve member, is centrally disposed coaxially of the cylindrical valve seat means, with the outer diameter of the valve assembly being less than the inner diameter of the valve seat means whereby to define a normal annular clearance. Additionally, hydraulic system means, including a slave hydraulic piston and cylinder assembly mounted within the regulator housing, are provided for selectively axially stressing the valve member between the backing members whereby the valve member may be radially expanded to restrict the annular clearance between the valve member and the valve seat.

It is an object of our present invention to provide a flow regulator of the class described wherein the components of the inner valve assembly are so constructed that compressive stress or strain on the deformable valve member is minimized.

It is another object of our present invention to provide a flow regulator of the class described wherein the components of the inner valve assembly are so constructed that, when the deformable valve member is radially expanded, shearing stress acting on the deformable valve member at the outer periphery of the backing members, and folding of the distended portion of the deformable valve member axially over the backing members, are minimized under all conditions of operation including a condition when a pressure drop occurs in the flow regulator.

It is another object of our present invention to provide a flow regulator of the class described wherein wear of the packing and other components of the hydraulic system is minimized by reducing the length of travel of the movable element of the slave hydraulic piston and cylinder assembly required to operate the inner valve assembly.

It is a further object of our present invention to provide a flow regulator of the class described wherein the fluid passageway means, the inner valve assembly, and the elements of the hydraulic system within the regulator housing, are so contoured that resistance to the smooth flow of fluid, and resultant pressure loss, through the flow regulator are minimized.

It is a still further object of our present invention to provide a flow regulator of the class described wherein useful life is maximized, hysteresis is minimized, and contamination of the hydraulic system by the fluid flowing through the regulator is minimized.

Now in order to acquaint those skilled in the art with the manner of construction and using flow regulators in accordance with the principles of our present invention, we shall describe in connection with the accompanying drawing a preferred embodiment of our invention.

In the drawing:

FIGURE 1 is a side elevational view, with portions being broken away and shown in section, of a preferred embodiment of flow regulator incorporating the principles of our present invention;

FIGURE 2 is a fragmentary sectional view, on an enlarged scale, of the inner valve assembly of the flow regulator of FIGURE 1 in one operative position;

FIGURE 3 is a fragmtenary sectional view, on an enlarged scale, of the inner valve assembly of the flow regulator of FIGURE 1 in another operative position;

FIGURE 4 is a fragmentary sectional view of the inner valve assembly of a prior art flow regulator in one operative position; and FIGURE 5 is a fragmentary sectional view of the inner valve assembly of the prior art flow regulator of FIGURE 4 in another operative position.

Referring now to FIGURE 1, there is indicated generally by the reference numeral 10 a flow regulator in which the principles of our present invention have been incorporated. The flow regulator 10 comprises a housing, indicated generally at 12, which includes an upstream hollow body section 14 and a downstream hollow body section 16. The adjacent ends of the body sections 14 and 16 are provided with annular coupling flanges 18 and 20 which are held together by a series of circumferentially spaced stud bolts 22 having nuts 24 threaded on the ends thereof. An O-ring 25 serves to seal the junction between the body sections 14 and 16. The body sections 14 and 16 at their opposite ends are respectively provided with annular coupling flanges 26 and 28 which are adapted to be suitably secured to the adjacent coupling flanges of sections of pipe line (not shown) through which the flow of fluid or gas is to be regulated.

Extending generally axially through the body sections 14 and 16 is fluid passageway means comprised of an inlet portion 30, an outlet portion 32, and an intermediate chamber portion 34. Mounted within the body section 14 is a sleeve or liner 36, the inner cylindrical surface 38 of which serves as an annular valve seat. The upstream body section 14 also has arranged interiorly thereof a central boss or abutment means 40 supported by or suspended from integral radial web portions 42 which serve to define arcuate flow passages 44. In a somewhat similar manner, the downstream body section 16 has arranged interiorly thereof a central boss or abutment means 46 supported by or suspended from integral radial web portions 48 which serve to define arcuate flow passages 50.

Cooperatively related with the valve seat 38 is an expansion-type inner valve assembly, which is indicated generally by the reference numeral 52, and which will be described in further detail hereinafter. Operation of the inner valve assembly 52 is adapted to be effected by means of a pneumatic diaphragm motor power source acting through a hydraulic linkage system now to be described.

The hydraulic linkage system comprises an axially directed stationary cylindrical slave piston 54 disposed within the intermediate chamber portion 34 and secured at one end to the downstream boss 46 by a threaded connection 56. Slidably mounted on the stationary piston 54 is a valve actuating slave cylinder 58 having a closed end wall portion 60 formed with an axial projection 62. Axial movement of the cylinder 58 in an upstream direction is selectively effected hydraulically. In this connection, the piston 54 is formed with a central axial passageway 64 which, at one end, communicates with the closed end wall 60 of the cylinder 58 and, at its other end, communicates with the inner end of a radial passageway 66 that extends from the boss 46 through one of the web portions 48 and the upper wall of the downstream body section 16. Packing in this part of the hydraulic system consists of an O-ring 68 at the adjacent faces of the downstream boss 46 and the piston 54, and an O-ring 70 with back up rings 71 and a wiper ring 72 carried in annular grooves in the piston 54 and engaging the inner surface of the cylinder 58.

Suitably secured to the downstream body section 16, as by bolts (not shown) is a support frame 74 which has a bore 76 therein which defines a master cylinder and which communicates at its lower end with the outer end of the passageway 66. Interposed at the junction of the bore 76 and passageway 66 is a roll pin alignment guide 78 and an O-ring 79. The lower end of a master piston 80 extends into the upper end of the bore 76 of the support frame 74 and is slidably mounted in guide sleeve and seal means 82. A downward force imposed on the master piston 80 is transmitted to the closed end wall 60 of the cylinder 58 by means of hydraulic fluid or oil within the passageways 64 and 66 and the bore 76. A suitable sealed bleeder screw 84 is arranged in the side of the support frame 74 to permit adjustment of the level of the hydraulic fluid within the described hydraulic system.

The upper end of the support frame 74 serves to support a diaphragm motor assembly indicated generally by the reference numeral 86. More particularly, the support frame 74 has mounted thereon, as by bolts 88, a lower diaphragm casing 90 to which is secured, as by bolts 92, an upper diaphragm casing 94. Disposed within the lower and upper casings 90 and 94, and secured about its periphery between the annular flanges thereof, is a diaphragm 96 which carries a diaphragm plate 98. The diaphragm plate 98, which is provided with a conventional depending indicator rod 99, has suitable engagement with the upper end of the master piston 80. The upper diaphragm casing 94 is provided with an inlet 100 which is adapted to be connected with a controller (not shown). When a pneumatic pressure signal is transmitted from the controller through the inlet 100 to the top of the diaphragm 96, the diaphragm 96, the diaphragm plate 98, and the master piston 80 are forced downwardly, thereby effecting operation of the inner valve assembly 52.

The afore-mentioned inner valve assembly 52, which is interposed between the upstream boss 40 and the cylinder 58 coaxially of the valve seat 38, is comprised of a pair of outer backing plates or discs 102 and 104 bonded to an intermediate valve disc 106 formed of rubber or other suitable incompressible elastic deformable material. The inner valve assembly 52 of our present invention incorporates improvements in both the shape and the relative size of the deformable valve disc 106. With respect to shape, the opposed surfaces of the deformable disc 106 are generally concave dish-shaped and, more particularly, are formed respectively with substantially parallel central face portions 108 and 110 and annular axially directed flange portions 112 and 114. The adjacent surfaces of the backing plates 102 and 104, which are formed respectively with central face portions 116 and 118 and annular straight or curved beveled portions 120 and 122, conformably mate with the dish-shaped surfaces of the deformable disc 106. With respect to size, when the deformable disc 106 is unstressed, the outer diameter thereof is approximately .875 times the inner diameter of the cylindrical valve seat 38, and the axial width of the main body portion of the deformable disc 106, that is, the axial distance between the central face portions 108 and 110, is approximately .5 times its outer diameter. In assembled relation, the backing plate 102 is suitably secured to the inner face of the upstream boss 40 by means of a retainer screw 124, and the backing plate 104, which has a central axial aperture 126 therein for receiving the axial projection 62 of the cylinder 58, abuts the closed end wall 60 of the cylinder 58.

When the deformable valve disc 106 is free of axial stress, the outer circumferential surface thereof, as shown in FIGURE 1, is radially spaced from the cylindrical valve seat 38 whereby an annular clearance is provided in the axial direction of pipe line flow. Under these conditions, maximum flow through the regulator 10 and pipe line can take place. When restriction of flow is desired, the diaphragm motor assembly 86 is actuated and the force developed thereby is transmitted through the hydraulic linkage system to the closed end wall 60 of the cylinder 58 thereby moving the latter and the backing plate 104 axially in the direction of the backing plate 102 and the boss 40 whereby the valve disc 106 is squeezed between the backing plates 102 and 104. When the valve disc 106, which is incompressible, is placed under axial stress, the outer circumferential surface thereof bulges or is distended radially outwardly into the annular clearance and toward the valve seat 38. Such outward displacement of the valve disc 106 serves to constrict the flow of fluid therepast, and at maximum radial displacement (FIGURE 2) the disc 106 contacts the valve seat 38 and seals off further fluid flow. Flow may be re-established through the regulator 10 by releasing the force transmitted by the hydraulic fluid linkage system to the cylinder 58 whereupon the energy stored in the deformable valve disc 106 serves to return the cylinder 58 to its normal position and the disc 106 to its normal shape. It will be appreciated that fluid or gas flow through the regulator 10 may be regulated in infinite steps with extremely fine control from full flow to bubble-tight shut-off by varying the radial expansion of the deformable valve disc 106 so as to vary the annular clearance between the disc 106 and the valve seat 38. An intermediate control position of the valve disc 106 is shown in FIGURE 3.

In order that the advantages of our flow regulator, and particularly the inner valve assembly thereof, may be readily understood, there is illustrated for comparison in FIGURES 4 and 5 fragmentary sectional views of the inner valve assembly of a prior art flow regulator indicated generally at A. The flow regulator A comprises a housing B having fluid passageway means extending therethrough and having a cylindrical valve seat C therein. The inner assembly of the flow regulator A includes a pair of outer backing members D and E which have sharp annular edges G and H and which are bonded to the opposite surfaces of an intermediate deformable valve cylinder F. When the deformable cylinder F is placed under axial stress and the outer circumferential surface thereof is distended radially outwardly into engagement with the valve seat C, as shown in FIGURE 4, the distended portion of the valve cylinder F folds axially over both of the backing members D and E. Such axial deformation or folding of the deformable cylinder F produces sheering stresses that act on the cylinder F at the peripheral edges G and H of the backing members D and E causing cutting and fatigue failure of the cylinder F. In contrast, by reason of the dish-shaped surfaces of the valve disc 106 and the mating surfaces of the backing plates 102 and 104 of our present invention, as shown in FIGURE 2, folding of the distended portion of the valve disc 106 axially over the backing plates 102 and 104 is substantially eliminated. Thus, the service life of the valve disc 106 is materially greater than that of the prior art valve cylinder F. As shown in FIGURE 5, when a pressure drop occurs in the regulator A, the distended portion of the valve cylinder F folds over the annular edge H of the downstream backing member E causing fatigue failure therearound and simultaneously tends to pull away from the upstream backing member D in the area of the annular edge G. Again, in contrast, by reason of the shape of the valve disc 106 of our present invention, when there is a pressure drop through the flow regulator 10 as shown in FIGURE 3, folding of the distended portion of the valve disc 106 over the downstream backing plate 104 is substantially absent, and pulling away of the valve disc 106 from the upstream backing plate 102 is minimized.

Still further, in prior art flow regulators, the axial width of the inner valve cylinder when unstressed heretofore has been maintained approximately equal to the outer diameter of the cylinder, and the relationship of the valve cylinder to the valve seat has been such as to require a relatively long travel of the movable element of the valve actuating hydraulic system to operate the inner valve assembly. Constrastingly, by reason of our providing a valve disc 106 wherein the outer diameter thereof is substantially .875 times the inner diameter of the valve seat 38 and the axial width of the main body portion thereof is approximately .5 times its outer diameter, the length of travel of the cylinder 58 required to operate the inner valve assembly 52 is materially reduced. Consequently, wear of the packing and other components of our hydraulic system is minimized. Finally, in our flow regulator 10, the fluid passageway means including the arcuate flow passages 44 and 50, the inner valve assembly 52, and the cylinder 58, which accommodate straight-through laminar flow, are so contoured that resistance to the smooth flow of fluid, and resultant pressure loss or drop, through the regulator are minimized. In this connection, the arrangement of the piston 54 and cylinder 58 is such as to minimize contamination of the hydraulic system by the fluid flowing through the regulator. Also, as a result of the streamlined flow pattern, turbulence and sound vibration are minimized.

While we have shown and described what we believe to be a preferred embodiment of our present invention, it will be understood by those skilled in the art that various rearrangements and modifications may be made therein without departing from the spirit and scope of our invention.

We claim:

1. In a flow regulator, a housing having fluid passageway means extending generally axially therethrough and having cylindrical valve seat means therein, a valve assembly including a pair of outer backing plates and an intermediate deformable valve disc centrally disposed coaxially of said cylindrical valve seat means, said valve disc having opposed surfaces formed with substantially parallel central face portions and annular axially directed flange portions, said valve disc when unstressed having an axial width between its said central face portions approximately .5 times its outer diameter, said outer backing plates having surfaces formed with central face portions and annular beveled portions conformably mating with the opposed surfaces of said valve disc, said valve disc when unstressed having an outer diameter approximately .875 times the inner diameter of said cylindrical valve seat means whereby an annular clearance is provided, first abutment means suspended within said fluid passageway means and engaging one of said outer backing plates, second abutment means suspended within said fluid passageway means and supporting an axially directed stationary cylindrical piston, a cylinder slidably mounted on said piston and having a closed end wall engaging the other of said outer backing plates, packing means between the sliding surfaces of said piston and said cylinder, and fluid passageway means extending through said piston whereby an actuating force may be transmitted through fluid therein to said closed end wall of said cylinder for moving the latter to axially stress said valve disc so as to radially expand the latter to restrict said annular clearance.

2. In a flow regulator, a housing having fluid passageway means extending generally axially therethrough and having cylindrical valve seat means therein, a valve assembly including a pair of outer backing plates and an intermediate deformable valve disc centrally disposed coaxially of said cylindrical valve seat means, said valve disc having generally concave opposed dish-shaped surfaces, said outer backing plates having surfaces conformably mating with the opposed surfaces of said valve disc, said valve disc when unstressed having an outer diameter less than the inner diameter of said cylindrical valve seat means whereby an annular clearance is provided, first abutment means suspended within said fluid passageway means and engaging one of said outer backing plates, second abutment means suspended within said fluid passageway means and supporting an axially directed stationary cylindrical piston, a cylinder slidably mounted on said piston and having a closed end wall engaging the outer of said outer backing plates, and fluid passageway means extending through said piston whereby an actuating force may be transmitted through fluid therein to said closed end wall of said cylinder for moving the latter to axially stress said valve disc so as to radially expand the latter to restrict said annular clearance.

References Cited
UNITED STATES PATENTS

| | | | |
|---|---|---|---|
| 607,492 | 7/1898 | Thomas | 251—189 |
| 1,603,991 | 10/1926 | Smithers | 138—89 |
| 1,781,224 | 11/1930 | Gilg | 251—191 |

M. CARY NELSON, *Primary Examiner.*

A. ROSENTHAL, R. J. MILLER, J. KNIGHT,
*Assistant Examiners.*

Disclaimer 3,368,787.—*Norman H. Sachnik* and *Jesse L. Culpepper, Jr.*, Houston, Tex. FLOW REGULATOR WITH RADIALLY EXPANDING ELASTOMERIC BLOCK. Patent dated Feb. 13, 1968. Disclaimer filed Oct. 3, 1977, by the assignee, *Vapor Corporation*.

Hereby enters this disclaimer to all claims of said patent.

[*Official Gazette January 17, 1978.*]